: 2,710,297
Patented June 7, 1955

2,710,297
PROCESS FOR THE PRODUCTION OF CYANTETRAZOLE, DITETRAZOLE, TETRAZOLE CARBAMIDE AND TETRAZOLE AND THEIR SALTS

Walter Friederich, Oberkassel/Siegkreis, Germany

No Drawing. Application April 27, 1954,
Serial No. 426,037

Claims priority, application Germany May 6, 1953

12 Claims. (Cl. 260—308)

This invention relates to a process for the production of cyantetrazole, ditetrazole, tetrazole carbamide and tetrazole and the salts thereof.

It is known that cyantetrazole, ditetrazole and tetrazole carbamide can be produced from hydrazoic acid and cyanide. According to the published literature, cyanide is introduced into concentrated aqueous hydrazoic acid with cooling. The cyanide is slowly absorbed to form cyantetrazole $HN_4CCN$, ditetrazole $HN_4CCN_4H$ and tetrazole carbamide $HN_4CCONH_2$. It is also known that when alkalis act on cyantetrazole, tetrazole carboxylic acid salts are formed, which on acidulation split off carbon dioxide to give tetrazole.

According to the present invention there is provided a process for the production of cyantetrazole, ditetrazole, tetrazole carbamide and tetrazole, or the salts thereof, wherein hydrogen cyanide and hydrazoic acid are reacted in aqueous solution with a copper salt and/or an oxidising agent such as manganese peroxide, permanganate, hydrogen peroxide, chromic acid or a ferric salt. Thus cyantetrazole may be formed from one molecule of sodium azide and four molecules of sodium cyanide in aqueous solution with the addition of acetic acid and an excess of copper sulphate, cuprous cyanide being simultaneously formed. If one molecule of sodium azide and an excess of copper sulphate are taken to two molecules of sodium cyanide, and the temperature is gradually raised to 90°–100° C. ditetrazole or its copper salt, which is insoluble in water, is formed. Depending upon the proportions and the temperature chosen, cyantetrazole or ditetrazole carbamide is obtained by saponification of the cyantetrazole, and in addition tetrazole is formed by further saponification of the tetrazole carbamide, carbon dioxide being split off. About half the hydrogen cyanide employed is separated off as insoluble cuprous cyanide. However, if suitable oxidising agents and acids are added, practically all the hydrogen cyanide reacts, a corresponding quantity of oxygen being consumed. Suitable oxidising agents include: manganese peroxide, permanganate, hydrogen peroxide, chromic acid and ferric salts. The reaction also occurs if no copper salt is employed, or with only a very small quantity of copper salt. However, a small quantity is desirable for a good yield.

If manganese peroxide is employed as oxidising agent, and half a molecule of hydrazoic acid is employed to every molecule of hydrogen cyanide, cyantetrazole is formed at temperatures below $+10°$ C., and can be separated from neutral solution in the form of its copper salt. However, if the mixture is gradually heated to 90°–100° C., the cyantetrazole absorbs one molecule of water, tetrazole carbamide being formed. On cooling the liquid, it is separated off in the form of its manganese salt difficultly soluble in cold water, from which salt it can be separated by dilute sulphuric acid, since it is difficultly soluble in cold water. As is known, the tetrazole carbamide can be converted by means of caustic soda solution into the sodium salt of tetrazole carboxylic acid, which can be converted into tetrazole by acidulation.

It is also possible to produce tetrazole from tetrazole carbamide by boiling the latter with acids. The yields are good and reach 90% of theory and more, calculated on the sodium azide consumed. Small quantities of unreacted hydrazoic acid and hydrogen cyanide can readily be recovered by distilling them off in caustic soda solution.

The invention is illustrated by the following examples.

EXAMPLE I

Production of cyantetrazole 100 parts of sodium cyanide and 65 parts of sodium azide are introduced into a flask containing 900 parts of ice and 100 parts of powdered manganese peroxide are added with agitation. The mixture is passed through a reflux condenser with prepared caustic soda solution, and a solution of 140 parts of concentrated sulphuric acid in 200 parts of water, in which 3 parts of copper sulphate are contained, mixed with 140 parts of 85% formic acid, is slowly run in with agitation, the temperature being kept below $+10°$ C. The running-in is finished after 10 to 20 minutes. The temperature is then allowed to rise to room temperature and maintained for some hours at 20° to 30° C. Small quantities of unreacted hydrogen cyanide and hydrazoic acid are thereafter distilled off in vacuo, and the cyantetrazole is separated off as silver salt or copper salt, or the mixture is distilled to dryness at moderate temperature and the cyantetrazole is extracted with a suitable solvent. The yield amounts to more than 90% of the theory.

EXAMPLE II

Production of ditetrazole 50 parts of sodium cyanide and 65 parts of sodium azide are introduced into 600 parts of water, 55 parts of manganese peroxide are added with stirring, and a solution of 100 parts of concentrated sulphuric acid, 80 parts of glacial acetic acid and 2 parts of copper sulphate in 200 parts of water is added in drops in one hour, with cooling. The mixture is thereafter slowly heated to 90°–95° C. in four hours and maintained at this temperature for three hours. Very small quantities of hydrogen cyanide and hydrazoic acid still present are distilled off and the precipitate, which consists of the manganese salt of ditetrazole with small impurities, is withdrawn by suction. The manganese salt is insoluble in cold water, and very little soluble in hot water. It can readily be converted by boiling with sodium carbonate to solution into the readily soluble and well crystallising sodium salt. The yield reaches 90% of theory and more, calculated on the sodium azide consumed. The mother solution still contains small quantities of tetrazole carbamide and tetrazole, which are formed as by-products.

EXAMPLE III

Production of tetrazole carbamide 100 parts of sodium cyanide and 65 parts of sodium azide are dissolved in 800 parts of water, 110 parts of manganese peroxide are added and 225 parts of concentrated sulphuric acid and 5 parts of copper sulphate dissolved in 400 parts of water, are then in within three hours with agitation and cooling with ice water. Instead of sulphuric acid, a corresponding quantity of hydrochloric acid may be employed. The mixture is then heated and hydrazoic acid and hydrogen cyanide are distilled off in caustic soda solution, the product is filtered to remove manganese peroxide and the ditetrazole salt of manganese and copper and evaporated to about 500 parts by volume and neutralised. On cooling, 70 to 80 parts of manganese tetrazole carbamide are separated off with one molecule of water of crystallisation. Further quantities can be obtained from the mother solution by concentration. In addition, the mother solution still contains some tetrazole. In a test, 5 parts of sodium azide and 4 parts of sodium cyanide were contained in the distillate. The precipitate contained 14 parts of manganese ditetrazole and copper ditetrazole.

I claim:

1. A process for the production of an azole selected from the group consisting of cyantetrazole, ditetrazole, tetrazole carbamide, tetrazole and the salts thereof, consisting in reacting together a cyanide selected from the group consisting of hydrogen cyanide and the metal salts thereof and an azide selected from the group consisting of hydrazoic acid and the metal salts thereof in aqueous solution in the presence of a Cu salt.

2. A process for the production of an azole selected from the group consisting of cyantetrazole, ditetrazole, tetrazole carbamide, tetrazole and the salts thereof, consisting in reacting together a cyanide selected from the group consisting of hydrogen cyanide and the metal salts thereof and an azide selected from the group consisting of hydrazoic acid and the metal salts thereof in aqueous solution in the presence of an oxidizing agent selected from the group consisting of potassium chlorate, manganese peroxide, chromic acid, hydrogen peroxide, permanganates and ferric salts.

3. A process for the production of an azole selected from the groups consisting of cyantetrazole, ditetrazole, tetrazole carbamide, tetrazole and the salts thereof, consisting in reacting together a cyanide selected from the group consisting of hydrogen cyanide and the metal salts thereof and an azide selected from the groups consisting of hydrazoic acid and the metal salts thereof in aqueous solution in the presence of a Cu salt and an oxidizing agent selected from the group consisting of potassium chlorate, manganese peroxide, chromic acid, hydrogen peroxide, permanganates and ferric salts.

4. Process according to claim 1, wherein the reaction is carried out in weakly acidic solution.

5. Process according to claim 4, wherein the aqueous solution contains hydrazoic acid and another organic acid selected from the group consisting of acetic acid and formic acid.

6. Process according to claim 2, wherein the reaction is carried out in weakly acidic solution.

7. Process according to claim 6, wherein the solution contains a metal azide and a mineral acid selected from the group consisting of hydrochloric acid and sulphuric acid.

8. A process according to claim 1 for the production of cyantetrazole, wherein sodium azide and sodium cyanide are reacted together in the ratio of 1 molecule of the azide to 4 molecules of the cyanide in a weakly acidic solution containing a mineral acid selected from the groups consisting of hydrochloric acid and sulphuric acid.

9. A process according to claim 1 for the production of ditetrazole, wherein sodium azide and sodium cyanide are reacted together in the ratio of 1 molecule of the azide to 2 molecules of the cyanide at a temperature ranging from 93 to 100° C. in a weakly acidic solution containing a mineral acid chosen from the group consisting of sulfuric acid and hydrochloric acid.

10. A process according to claim 3, for the production of cyantetrazole, wherein sodium azide and sodium cyanide in the proportions of one molecule of the azide to two molecules of the cyanide are reacted together with manganese peroxide and copper sulphate in a weakly acidic solution containing a mineral acid chosen from the group consisting of hydrochloric acid and sulfuric acid, at a temperature below 30° C.

11. A process according to claim 3 for the production of tetrazole carbamide, wherein sodium azide and sodium cyanide in the proportion of one molecule of the azide to two molecules of the cyanide are reacted together with manganese peroxide and copper sulphate in a weakly acidic solution containing a mineral acid selected from the group consisting of hydrochloric acid and sulfuric acid at a temperature of 90 to 100° C.

12. A process according to claim 3, consisting in reacting together hydrogen cyanide and hydrazoic acid in the presence of hydrogen peroxide in a weakly acidic solution containing an acid selected from the group consisting of acetic acid and formic acid.

References Cited in the file of this patent

FOREIGN PATENTS

| | | |
|---|---|---|
| 390,396 | Germany | Feb. 18, 1924 |
| 843,916 | France | Apr. 3, 1939 |

OTHER REFERENCES

Dimroth et al., Ber. Deut. Chem., vol. 43, pp. 2219–23 (1910).

Mihina et al., J. Org. Chem., vol. 15, pp. 1082–92 (1950).